United States Patent
Dubil et al.

(10) Patent No.: US 6,748,462 B2
(45) Date of Patent: Jun. 8, 2004

(54) ACTIVITY-BASED REMOTE CONTROL DEVICE

(75) Inventors: Thomas James Dubil, Morgan Hill, CA (US); Diane Perry Daniel, San Jose, CA (US); Tanya Ornatskaya, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 228 days.

(21) Appl. No.: 10/027,332

(22) Filed: Dec. 20, 2001

(65) Prior Publication Data

US 2003/0120831 A1 Jun. 26, 2003

(51) Int. Cl.$^7$ ................................................ G06F 3/00
(52) U.S. Cl. ........................ 710/8; 710/18; 710/41; 710/73; 709/304; 345/157
(58) Field of Search ............................. 710/15, 8, 17, 710/18, 33, 41, 73, 1, 7, 12; 712/225; 709/304, 305; 340/825.69; 345/157, 184, 552; 341/176

(56) References Cited

U.S. PATENT DOCUMENTS

| | | | | |
|---|---|---|---|---|
| 4,566,034 A | * | 1/1986 | Harger et al. | 358/194.1 |
| 4,746,919 A | * | 5/1988 | Reitmeier | 34/825.56 |
| 5,204,768 A | * | 4/1993 | Taskiris et al. | 359/148 |
| 6,195,033 B1 | * | 2/2001 | Darbee et al. | 341/176 |
| 6,292,172 B1 | * | 9/2001 | Makhlouf | 345/157 |
| 6,507,306 B1 | * | 1/2003 | Griesau et al. | 341/176 |
| 6,567,011 B1 | * | 5/2003 | Young et al. | 340/825.69 |

FOREIGN PATENT DOCUMENTS

WO      WO 01 54292      7/2001

OTHER PUBLICATIONS

U.S. patent application Ser. No. 09/311,128, Kemink, filed May 13, 1999, copending.
U.S. patent application Ser. No. 09/519,546, Ekkel et al., filed Mar. 6, 2000, copending.

* cited by examiner

Primary Examiner—Rehana Perveen
Assistant Examiner—RiJue Mai
(74) Attorney, Agent, or Firm—Dicran Halajian

(57) ABSTRACT

A remote control device provides commands and options based on the configuration of components in a user's environment, and based on a defined user activity. A storage device contains a user profile that includes the configuration of components at the user's environment, and defined set of user activities, such as "watching television", "viewing a movie", "watching a sports program", and so on. Each user activity has a corresponding mapping of keys on the remote control device to facilitate the user activity. When the user identifies a preferred activity, the remote control device communicates commands to the components of the system to support the activity, and subsequently communicates commands to each component corresponding to this activity. A user may define multiple user activities, and the storage device may contain configurations and activities from multiple users.

15 Claims, 2 Drawing Sheets

| | Watch TV | View Movie | Recordings | Default |
|---|---|---|---|---|
| Volume | TV | AAmp | TV | AAmp |
| Channel | SatTV | - | VCR | SatTV |
| Scan | VCR | DVD | VCR | VCR |

| Activity | Genre | Source | Audio | Presets |
|---|---|---|---|---|
| Watch TV | News | Cable | TV | List A |
|  | Sports | Satellite | TV | List B |
|  | Movies | Satellite | Surround | List C |
| Watch DVD | Any | DVD | Surround | List C |
| Watch VCR | Any | VCR | Stereo | List B |
| Default | Any | (prior) | TV | Default |

ACTIVITY-BASED REMOTE CONTROL DEVICE

BACKGROUND OF THE INVENTION

1. Field of the Invention

This invention relates to the field of consumer products, and in particular to a remote control device for the control of a variety of devices comprising a multi-media system.

2. Description of Related Art

Remote control devices are common in the art. "Universal" remote control devices are commonly used to control a variety of components, or appliances, that comprise a typical home video system. These remote control devices typically include a 'mode' button, or set of buttons, that determines which component is being controlled. For example, the remote device may include a selector button for choosing between a VCR, a Cable box, a Satellite box, a television, and so on. When the user selects a particular mode, the other buttons on the remote device are configured to emit the appropriate transmission corresponding to the intended controlled component. For example, when the user selects TV, and subsequently hits the 'channel-up' key, the remote device transmits the code that is associated with effecting a channel-up action on the user's television. If the user selects SAT, and subsequently hits the same 'channel-up' key, the remote device transmits a different code; in this case, the code that is associated with effecting a channel-up action on the user's satellite-television control box is transmitted. That is, the mode of the remote device controls the mapping of button closures to a particular set of command codes, each set of command codes being associated with a component that is associated with each mode option.

Some universal control devices also include configurable default mappings of select buttons. For example, if the universal control device is provided by the vendor of a cable-control box that does not include a volume control, the vendor may pre-configure the remote control device to use the volume control codes associated with the user's television whenever the remote device is in either the television mode or the cable mode. This allows the user to adjust the volume without effecting a mode-change from the cable mode. In like manner, some universal control devices include a 'learn' or 'copy' feature, wherein select keys on the control device includes a receiver that records codes from another remote control device, and associates each recorded code to a select key on the control device. In this manner, the control device can record codes from control devices associated with different components, thereby allowing the control device to control different components without requiring a mode change. For example, volume-changing codes from a television remote control can be recorded by the universal control device and associated to the volume-up and volume-down keys of the universal control device, and channel-changing codes from a VCR remote control can be recorded by the same universal control device, and associated with the channel-up and channel-down keys. The recording of a code for each key on a universal remote control device, however, is a tedious process, because it generally requires the activation of the different component remote control devices to transmit each code, and a corresponding identification of the key on the universal devices that is to be associated with the transmitted code. Generally, therefore, most universal control devices allow for an identification of a particular component, via a code number, and associate each device function code to the particular keys of the remote control device automatically. Thereafter, as discussed above, the user selects which component's function codes are to be associated with the keys of the universal remote control device via a mode selection.

Despite the availability of universal remote control devices, most homes that have more than one or two controllable components are likely to be found with more than one remote control device readily on hand. Often, it is easier to merely pick up a different control device for particular components or functions, such as rarely used components, rather than changing the mode of a remote control device, and then dealing with the consequences of forgetting to change the mode back to its normal mode before pressing a button intended to control another component. Also, in some households, for example, some occupants prefer to listen to the audio portion of any program through the home's 'surround-sound' system, while others prefer to listen to the audio portion of programs, such as the news programs and the like from the local television speakers. In such an environment, the use of separate controllers for volume control, one for the surround-sound system, and one for the television, is often preferred.

Additionally, in a complex multi-media system, with multiple input and output options, changing from one mode of entertainment to another can be a daunting task, particularly to non-technical users. Changing from watching a satellite-TV news broadcast to watching a DVD movie, for example, often requires changing the video input to the television, turning off the power to the satellite receiver, turning on the power to the DVD player, switching the audio from the television console to a stereophonic audio system, adjusting the audio system to the user's preferred listening level, and so on.

BRIEF SUMMARY OF THE INVENTION

It is an object of this invention to provide a method and system that facilitates the configuration of a remote control device for use in a multiple-component system. It is a further object of this invention to provide a remote control device that eases the task of controlling components within a multiple component system. It is a further object of this invention to provide a remote control device and system that facilitates user-specific control of the system. It is a further object of this invention to provide a remote control device and system that serves to integrate components in a multiple-component system.

These objects and others are achieved by providing a remote control device and system that is system-aware, and activity-aware. The remote control device provides commands and options based on the configuration of components in a user's environment, and based on a defined user activity. A storage device contains a user profile that includes the configuration of components at the user's environment, and defined set of user activities, such as "watching television", "viewing a movie", "watching a sports program", and so on. Each user activity has a corresponding mapping of keys on the remote control device to facilitate the user activity. When the user identifies a preferred activity, the remote control device communicates commands to the components of the system to support the activity, and subsequently communicates commands to each component corresponding to this activity. A user may store multiple user activities, and the storage device may contain configurations and activities from multiple users.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
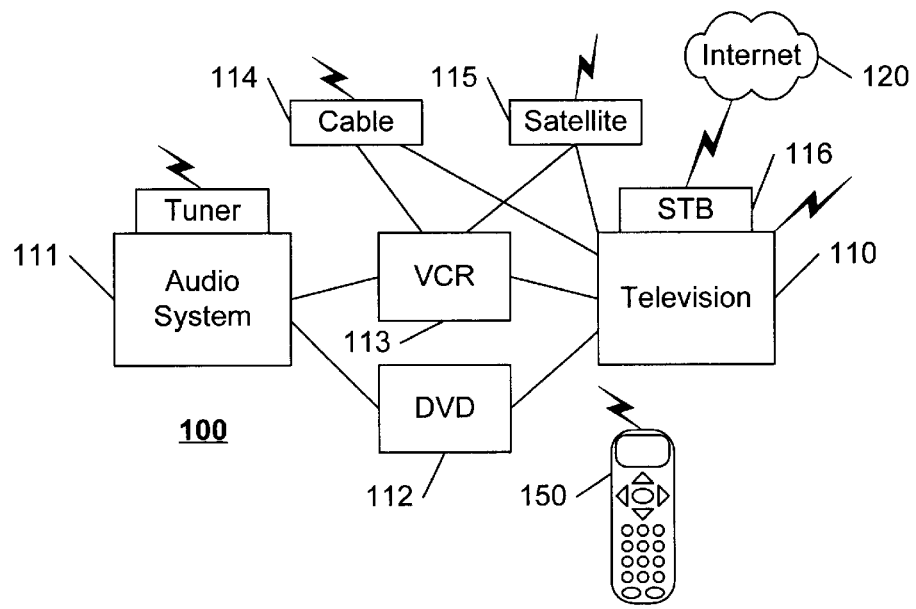
FIG. 1 illustrates an example system comprising multiple components and a remote control device.

FIG. 1 illustrates an example system comprising multiple components and a remote control device. The example system 100 includes a television 110, an audio system 111, a DVD player 112, a VCR 113, a cable interface 114, a satellite receiver 115, a set-top box 116, and so on. A remote control device 150 provides for remote control of some or all of the components 110–116. The system 100 is provided for illustrative purposes, fewer or more components may comprise a particular user's system 100. Although the example diagram of system 100 illustrates the configuration of the components, it provides little, if any, information regarding the control and/or data flow of the system at any particular point in time. That is, in operation, the system 100 may receive audio-video information from the satellite receiver 115 and provide the video to the television 110 and the audio to the audio amplifier 111. At another point in time, the system 100 may provide audio-video information from the VCR 113, and provide both the video and the audio information to the television 110.

Figures 2A, 2B:
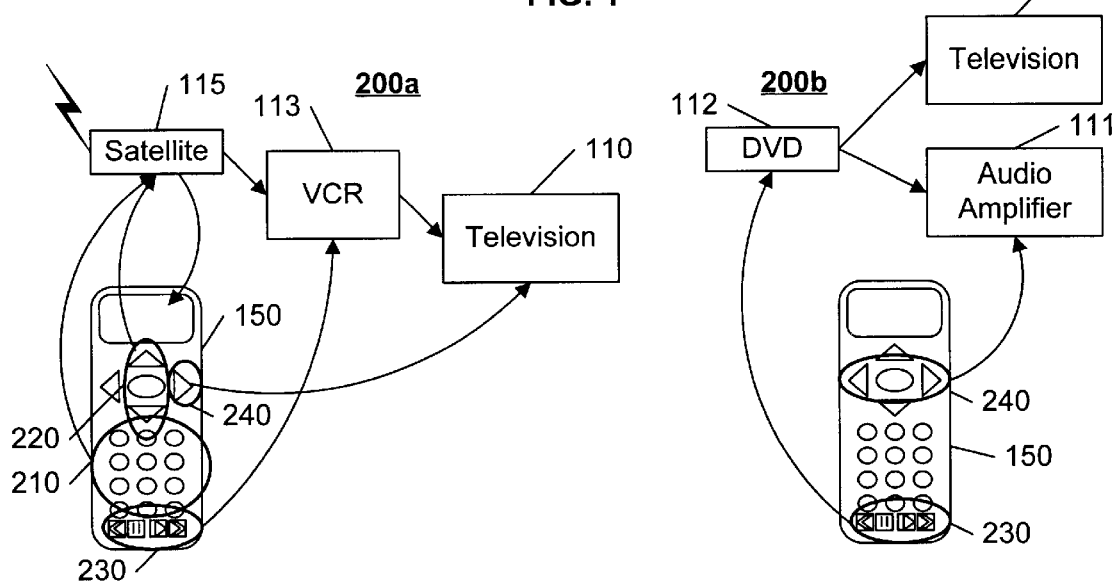
FIGS. 2A–2B illustrate example inter-operation of components of a system corresponding to different user activities.

For the purposes of this invention, a "system configuration" includes an identification of components comprising the system, and an "activity set" includes an association of select system functions to particular components to support a particular user activity. For example, although multiple components of a system may include an audio output signal, an activity set identifies which particular component in the system provides the audio output of the system. In like manner, the activity set will identify the component providing the audio-video information, and, depending upon the component, whether the system is configured to select from among various channels associated with the source component. FIGS. 2A–2B illustrate example activity sets of the system 100 illustrated in FIG. 1.

FIG. 2A, for example, illustrates an activity set 200a for watching or recording satellite broadcasts, wherein audio-visual information is received by a satellite receiver 115, which provides the audio-visual information to a VCR device 113 for optional recording. Other storage devices, such as a "Tivo" device, may be provided in the path, either before or after, or in lieu of, the VCR device 113. In the example activity set of FIG. 2A, the VCR 113 provides the video and audio information to the television 110.

Alternatively, the system 100 of FIG. 1 may be functionally configured as illustrated in FIG. 2B, to facilitate viewing a DVD movie. In this example activity, the DVD player 112 is the source of the audio-visual information. The DVD player 112 provides the video information to the television 110, and the audio information to the audio amplifier 111.

In accordance with this invention, the remote control device 150 is configured to allow for a different mapping of control functions to the keys of the remote control device 150, depending upon the particular activity being supported by the system 100. To support the "watch/record satellite broadcast" activity of FIG. 2A, for example, the remote control device 150 is configured to associate the numeric keys 210 and the channel-up and channel-down keys 220 with the satellite receiver 115, the scanning keys, such as the fast-forward, forward, stop, and so on, keys, to the VCR 113, and the volume controls 240 to the television 110. To support the "view movie" activity of FIG. 2B, on the other hand, the scanning keys 230 are associated with the DVD device 112, and the volume control keys 240 are associated with the audio amplifier 111. That is, when the remote control device 150 is programmed to support activity set 200a, the activation of scanning keys 230 effect a control of the VCR 113, whereas the activation of the same scanning keys 230 effect the DVD player 112 when the remote control device 150 is configured to support the activity set 200b of FIG. 2B.

In accordance with this invention, the keys of the remote control device 150 are associated with different components 110–116, depending upon the activity set 200a, 200b, thereby eliminating the need for the user to effect a mode change in order to control each of the different components 110–116. That is, a typical universal controller includes a sufficient number of keys to allow for each of the functions that are commonly employed while operating a multimedia entertainment system, such as volume controls, channel selections, scan controls, viewing controls (brightness, contrast, zoom, etc.), menu controls, and so on. In a preferred embodiment of this invention, each of these functions is associated with a particular component of the entertainment system, depending upon how the components are currently being used. In this manner, the functions provided by the keys of the remote control device 150 are optimized for the particular activity. By associating each of the keys of the remote control device 150 to select components, the need to invoke a mode-change to control different devices depending upon the desired function, as is typical with a conventional remote control device, is minimized or eliminated.

Figures 3, 4, 5:
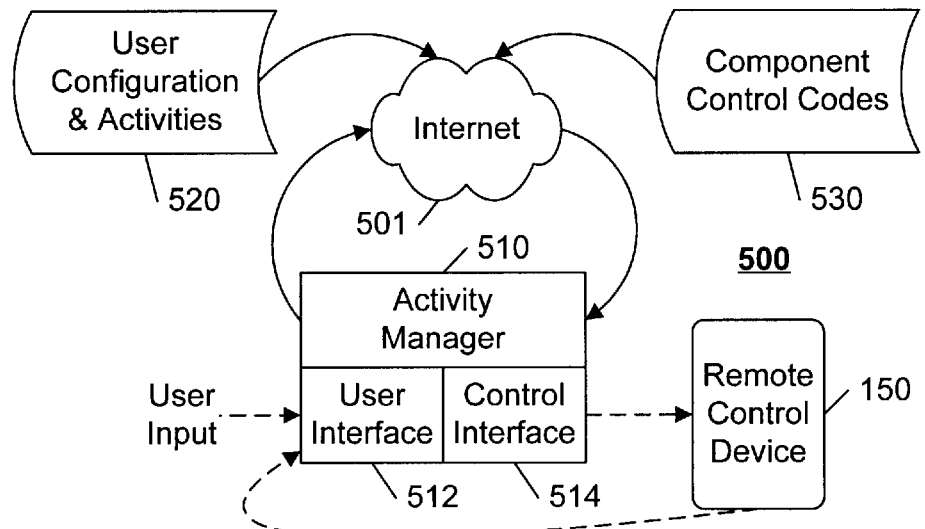
FIG. 3 illustrates an example data structure for describing user activities.
FIG. 4 illustrates an example alternative data structure for describing user activities.
FIG. 5 illustrates an example block diagram of a remote control system.

FIG. 3 illustrates an example data structure for describing activity sets. In this example, the sets correspond to three specific activities 301–303, and one default activity 304. Each activity set includes a mapping of three functions, Volume 310, Channel 320, and Scan 330, to particular components. As will be evident to one of ordinary skill in the art, other functions may also be mapped to components.

In the following paragraphs, the numeric references that begin with the numerals 1 or 2 refer to items illustrated in FIGS. 1, 2A, and 2B.

The first activity set, Watch TV 301, corresponds to the activity illustrated in FIG. 2A. The Volume functions 311 are associated with the television 110; the Channel functions 321 are associated with the satellite receiver 115; and the Scan functions 331 are associated with the VCR 113. Based on this activity set, the remote control device 150 is programmed such that the volume control keys 240 on remote control device 150 effect a transmission of codes corresponding to the volume control codes associated with the television 110. In like manner, the channel control keys 210, 220 on the remote control device 150 effect a transmission of codes corresponding to the channel control codes associated with the satellite receiver 115, and the scan control keys 230 effect a transmission of codes corresponding to the scan control codes associated with the VCR 113.

In like manner, the second activity set, View Movie 302, corresponds to the activity illustrated in FIG. 2B, wherein the volume control keys 240 are configured to correspond 312 to volume control codes associated with the audio amplifier 111, and the scan control keys 230 correspond 332 to scan control codes associated with the DVD 112. In this example activity set, the channel functions 322 are not specifically associated with a component. Alternative embodiments are available for unmapped functions. In one embodiment, the unmapped keys remain unchanged from the prior activity set; in another embodiment, the unmapped keys are disassociated from a component, thereby rendering the unmapped keys inactive. In a preferred embodiment, a mix of prior associations and disassociations is used, depending upon the particular keys.

FIG. 4 illustrates an example alternative data structure for describing activity sets. In this example, an activity 401 may be further partitioned based upon the genre 402 of the content material. The selection of a genre 402 provides an identification of the source 403 of the material, and an identification of which component is configured to provide the audio 404 portion of the content material. Other partitionings or classifications of activities may also be supported, such as a partitioning of an activity based on the particular user in a multi-user environment. That is, different users may have different preferences for supporting the same activity within a given system. One or more keys on the remote control device are configured to facilitate the selection of an activity set, including the identification of the individual user.

According to a further aspect of this invention, the selection of an activity 401, or a select partition 402 of an activity 401, also determines a preferred list of presets 405 that are to be applied to support the selection. These presets 405 may include, for example, a sequence of commands that are communicated to the individual components of the system to effect the indicated activity set. For example, most television display systems include an "input" selection command to select the input to the television display from among the various components that are able to provide a video input, such as the DVD 112, the VCR 113, the cable receiver 114, and so on. In the example of FIG. 4, when the user selects the activity "Watch TV, News" 412, a list of presets, ListA 415, is identified. This list 415 in a preferred embodiment will include the command that switches the video and audio input of the television to the cable receiver to implement the activity set illustrated on the first line of the chart in FIG. 4, corresponding to the selection of the News genre 412. ListA 415 in this example may also include one or more volume control commands to automatically adjust the volume of the television based on the user's preferred volume for listening to News programs. The ListA 415 may also include command codes that activate or deactivate a recording device based on the user's preferences, and so on.

One of ordinary skill in the art will recognize that the preset lists 405 may contain any of a variety of device control operatives, including control code for other controllable devices, or appliances. For example, the presets 405 may include controls that adjust the lighting level in the viewing area based upon the genre of the material being viewed. One of ordinary skill in the art will also recognize that the lists 405 may contain a plurality of command sets, each of the command sets being associated with a different means of communicating the commands to the controlled components or appliances. In the aforementioned lighting example, the lighting commands may be communicated via a home-automation network system to the lights, rather than by the remote control device 150, thereby enabling an integration of the system activity set aspects of this invention with existing and future control technologies.

FIG. 5 illustrates an example block diagram of a remote control system 500 in accordance with this invention. In this example, an activity manager 510 has access to a database of user configurations and activity sets 520 and a database of component control codes 530. The activity manager 510 receives user input, via a user interface 512, and provides control codes to a remote control device 150, based on the user input, via a control interface 514. For the purposes of this invention, the term database is used to identify a collection of data that is organized for retrieval of select information; this collection of data may be distributed among a variety of storage devices and storage systems.

The user interface 512 includes, generally, two types of user input processing. The user either creates an activity set, or invokes an activity set. The user invokes an activity set, using, for example, selection keys on the remote control device 150, or using a menu that is presented on a display device. Based on this selection input, the activity manager 510 accesses the database of user activity sets 520 to determine which component functions are being mapped to which keys on the remote control device 150. If necessary, the activity set manager 510 accesses the component control code database 530 to determine the code that the remote control device 150 will required for this activity set. If, as presented above, the user activity set 520 includes a preset list, or similar command construct, associated with a selected activity set, the activity set manager 510 processes the preset list and provides the appropriate commands to the remote control device 150, or to another control device, to effect the commands of the list.

In accordance with the principles of this invention, the activity set manager 510 communicates a set of control codes to the remote control device 150, each control code being uniquely mapped to a key of the remote control device 150, wherein the set of control codes correspond to more than one component, as detailed above. Techniques for programming the keys of a remote control device are common in the art, and continue to be developed. Copending U.S. patent application Ser. No. 09/311,128, "INTERNET-BASED SERVICE FOR UPDATING A PROGRAMMABLE CONTROL DEVICE", filed May 13, 1999 for Joost Kemink, and incorporated by reference herein, teaches a system and method for updating or customizing a programmable control device via an Internet-based service. Based on an identification of the components in a user's system, the system of this copending application downloads the control codes associated with the component, as well as customized graphic user interfaces (GUIs) that facilitate the control of the particular component.

The creation of a user configuration and activity set is a more complicated process. Conventional menu-driven techniques can be used to allow a user to create an activity set via the remote control device 150, akin to the techniques provided to allow a user to program a VCR to record a particular program at a particular time, or at periodic time intervals. Such a process can be a bit cumbersome, however.

To facilitate the creation of a user configuration, copending U.S. patent application Ser. No. 09/519,546, "PERSONALIZING CE EQUIPMENT CONFIGURATION AT SERVER VIA WEB-ENABLED DEVICE", filed Mar. 6, 2000 for Erik Ekkel et al., and incorporated by reference herein, teaches a system and method wherein a user uses a device, such as a personal computer, to interface with a configuration application program. The application program collects the information from the user regarding the configuration of the user's equipment, and then creates one or more data sets that can be downloaded to the equipment to effect the configuration. By using a personal computer to obtain the user information, the audio-video equipment of a user's system need not be burdened with providing a user interface for receiving and processing the user's information to create the configuration.

In a preferred embodiment of this invention, the activity manager 510 provides a menu-driven application for the creation of the user's system configuration and each user activity set via the remote control device 150, and also provides an application for the creation of the configuration and activity sets via a personal computer. Preferably, the application allows for the creation of the activity set by filling in a form or table, such as illustrated in FIGS. 3 and 4, or, by manipulating graphic objects to form the desired activity set from among the components of the user's system configuration.

Preferably, the activity manager 510 compiles the activity set into the appropriate set of command codes when the user creates the activity set, and stores the corresponding set of command codes with each activity set, so that these codes are immediately available when the user subsequently invokes a particular activity set.

In the example system of FIG. 5, each device 510–530 is connected to the Internet 501, signifying that the communication and storage of information in the system of this invention may be provided, in whole or in part, via the Internet 501. In such an embodiment, a third party vendor may provide an Internet-based application program for creating the user configuration and activity sets 520. Thereafter, the compiled command codes corresponding to each activity set may be stored at the third party's Internet site, or downloaded to a storage device at the user location, such as to a set-top box (STB 116 of FIG. 1) that is configured to provide the compiled code to the remote control device 150 on demand. Alternatively, the remote control device 150 may be configured to store a plurality of sets of compiled command codes, corresponding to each of a plurality of user activity sets.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

We claim:

1. A remote control system, comprising:
   a storage device that is configured to store a plurality of activity sets,
   a remote control device that is configured to selectively access each activity set of the plurality of activity sets from the storage device,
   wherein:
      each activity set includes a mapping of select component functions to assigned keys of the remote control device, the select component functions being associated with a plurality of components, and
      the remote control device is configured to control a first component of the plurality of components when a key in a first set of the assigned keys are activated, and to control a second component of the plurality of components when a key in a second set of the assigned keys are activated, based on the selectively accessed activity set.

2. The remote control system of claim 1, wherein the remote control device is further configured to provide an initial sequence of commands to at least one of the first and second components to effect the selectively accessed activity set.

3. The remote control system of claim 1, wherein the storage device is located at an Internet web site, and the remote control system further includes
   an Internet access device that is configured to facilitate access to the storage device by the remote control device.

4. The remote control system of claim 1, further including a user interface that facilitates creation of the plurality of activity sets.

5. The remote control system of claim 1, further including an activity manager that facilitates creation of the plurality of activity sets.

6. The remote control system of claim 5 wherein at least one of the activity manager and the storage device is located at an Internet site.

7. An activity manager, comprising:
   a user interface that is configured to obtain user input regarding an activity set, and
   a control device interface that is configured to provide a plurality of control codes to a remote control device, based on the activity set,
   wherein
      the activity set identifies a mapping of functions among a plurality of components,
      the plurality of control codes that are provided to the remote control device correspond to more than one component of the plurality of components, and,
      each control code of the plurality of control codes is uniquely mapped to a key of a plurality of keys of the remote control device.

8. The activity manager of claim 7, further including a storage device that is configured to store the activity set as one of a plurality of activity sets, and
   wherein the control device interface is further configured to facilitate a selection from among the plurality of activity sets.

9. The activity manager of claim 7, wherein the activity manager is configured to obtain the user input via an Internet connection.

10. The activity manager of claim 7, wherein the activity manager is configured to provide the plurality of control codes to the remote control device via an Internet connection.

11. The activity manager of claim 7, wherein at least some of the activity manager is located at an Internet web site.

12. The activity manager of claim 7, wherein the activity manager is further configured to effect one or more control options when a user selects the activity set.

13. A remote control device comprising:
    a plurality of keys, and
    a storage device that is configured to store control codes corresponding to each of a plurality of activity sets, wherein
    each of the plurality of activity sets identifies a mapping of the plurality of keys to control codes of a plurality of components,
    at least one key of the plurality of keys facilitates a selection of a select activity set of the plurality of activity sets.

14. A method of providing a plurality of activity sets to a remote control device, comprising:

for each activity set:
- defining an activity selection key of the remote control device to facilitate selection of the activity set,
- determining a set of control functions corresponding to other keys of the remote control device,
- defining a mapping of the set of control functions to a plurality of components,
- determining control codes corresponding to the set of control functions and the plurality of components, and
- communicating the control codes to the remote control device for storage at the remote control device to facilitate use of the control codes corresponding to the activity set when the activity selection key is used.

15. The method of claim 14, wherein the control codes include codes corresponding to more than one component of the plurality of components.

* * * * *